United States Patent [19]
Yano et al.

[11] Patent Number: 4,478,053
[45] Date of Patent: Oct. 23, 1984

[54] AIR-CONDITIONING MACHINE

[75] Inventors: Nobuyuki Yano, Hirakata; Takuro Kotera, Kawanishi; Akira Aoki, Neyagawa; Toshio Utagawa, Hirakata, all of Japan

[73] Assignee: Toyota Jidosha Kabushiki Kaisha, Toyota, Japan

[21] Appl. No.: 482,170

[22] Filed: Apr. 5, 1983

[30] Foreign Application Priority Data

Apr. 5, 1982 [JP] Japan .................. 57-56348

[51] Int. Cl.³ .................. F25D 23/12; F25B 29/00
[52] U.S. Cl. .................. 62/262; 62/325
[58] Field of Search .................. 62/262, 325, 410-412

[56] References Cited
U.S. PATENT DOCUMENTS

| | | | |
|---|---|---|---|
| 2,391,151 | 12/1945 | Gibson | 62/325 |
| 2,401,560 | 6/1946 | Graham et al. | 62/262 X |
| 2,878,657 | 3/1959 | Atchison | 62/325 |
| 2,969,652 | 1/1961 | Blanchard | 62/262 X |
| 2,999,370 | 9/1961 | Eberhart | 62/262 X |
| 3,018,642 | 1/1962 | Lathrop | 62/262 X |
| 3,143,864 | 8/1964 | Schordine | 62/325 |
| 3,995,446 | 12/1976 | Eubank | 62/325 |
| 4,285,210 | 8/1981 | McCarty | 62/325 |

FOREIGN PATENT DOCUMENTS

| | | |
|---|---|---|
| 0029573 | 3/1981 | European Pat. Off. . |
| 0044560 | 1/1982 | European Pat. Off. . |
| 1939147 | 8/1969 | Fed. Rep. of Germany . |
| 2248549 | 10/1972 | Fed. Rep. of Germany . |
| 1498621 | 1/1978 | United Kingdom . |

Primary Examiner—Lloyd L. King
Attorney, Agent, or Firm—Cushman, Darby & Cushman

[57] ABSTRACT

An air-conditioning machine having, in blocks within the same box body, an indoor-air circulation wind passage, an outdoor-air circulation wind passage, and a ventilation wind passage. An opposite-flow heat exchanger, designed to recover the heat in the ventilation wind passage, is provided. One of two opposite faces having two wind passage openings in one face of the opposite-flow heat exchanger faces the outdoor-air circulation wind passage. The other thereof faces the indoor-air circulation wind passage. Shutters or dampers are provided on both of the faces. Functions of cooling and heating, heating and exchange ventilation, and simultaneous feed and exhaust non-heat-exchange ventilation can be exhibited.

10 Claims, 6 Drawing Figures

4,478,053

AIR-CONDITIONING MACHINE

BACKGROUND OF THE INVENTION

The present invention relates to a heat pump air conditioner of a wind type with an indoor heat exchanger, an outdoor heat exchanger and blowers being disposed in one box body.

As many of the conventional heat pump air conditioners are used exclusively for cooling, the service period thereof is restricted throughout the year. Also, when the indoor air has become foul during operation, the indoor air is required to be ventilated. Thus, some of the heat pump air conditioners of this type are provided with a ventilation function. However, the energy loss caused by the ventilation is unavoidable in this case. Some air-conditioning ventilation fans adapted to reduce the ventilation loss use total heat exchangers, but are not provided with the cooling and heating functions during such use. Also, the conventional heat pump air conditioners of a wind type or the conventional air-conditioning ventilation fans thereof, which are of non-heat-exchange type and are not provided with a separate ventilating function, have a disadvantage in that the energy-saving open-air cooling operation as in the wind fan cannot be effected during the nights of the summer when the outdoor temperature has become lower than the room temperature.

SUMMARY OF THE INVENTION

Accordingly, an essential object of the present invention is to provide an air-conditioning machine, which has many functions such as cooling, heating, ventilating, total heat exchange ventilating operations, or the like, and furthermore saves energy and increases comfort.

Another object of the present invention is to provide an air-conditioning machine, which uses the advantages of the conventional air-conditioning machines, diminishes the disadvantages thereof, and can be used throughout the year.

According to the present invention, an air-conditioning machine wherein an indoor-air circulation wind-passage provided with an indoor heat exchanger and a blower for circulating the indoor air, an outdoor-air circulation wind passage provided with an outdoor heat exchanger and a blower for circulating the outdoor air, and a ventilation wind passage composed of an indoor-air exhaust wind passage and an outdoor-air feed wind passage for performing the ventilation, exchanging heat between the indoor air for the outdoor air, are formed in blocks within the same box body, an opposite flow type heat exchanger is provided at the intersecting portion between the ventilation wind passages, one end of said outdoor-air feed wind passage opens, through the heat exchanger, to the middle portions of said indoor-air circulation wind passage and said outdoor-air circulation wind passage, one end of the indoor-air exhaust wind passage opens, through the same heat exchanger, to the middle portions of said indoor-air circulation wind passage and said outdoor-air circulation wind passage, and dampers or shutters are provided, to open or shut said openings, respectively, at the opposing two faces of the outdoor-air circulation wind passage and the indoor-air circulation wind passage, and the two wind-passage openings on each side of said opposite flow type heat exchanger.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
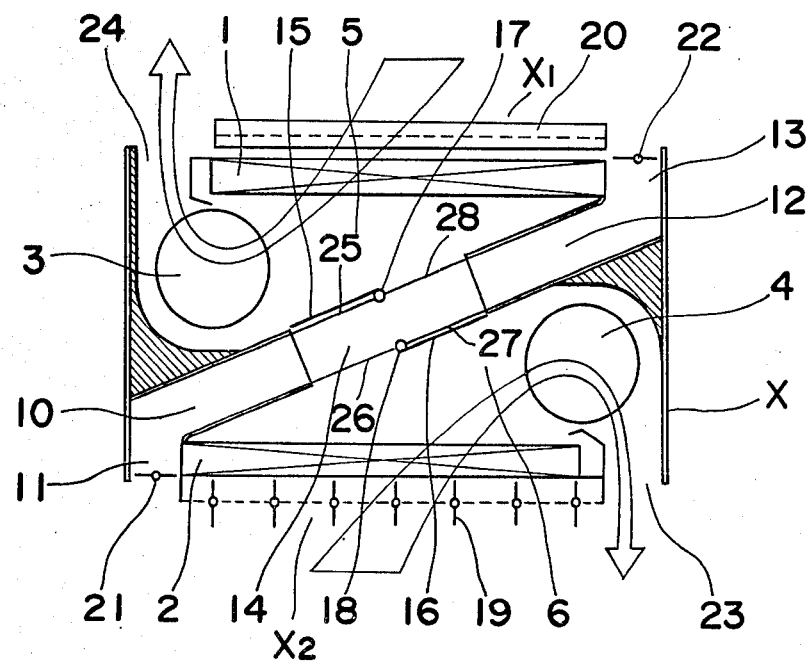
FIGS. 1, 4, 5, 6 are cross-sectional views, seen from above, in one embodiment, of a heat pump air-conditioner of the present invention, respectively showing the flows of air currents during the cooling and heating operations, during the partial total heat exchange ventilating operation in the cooling and heating operations, during the total heat exchange ventilating operation, and during the simultaneous feed and exhaust ventilating operation with non-heat-recovery.

Before the description of the present invention proceeds, it is to be noted that like parts are designated by like reference numerals throughout the several views of the accompanying drawings.

Figure 2:
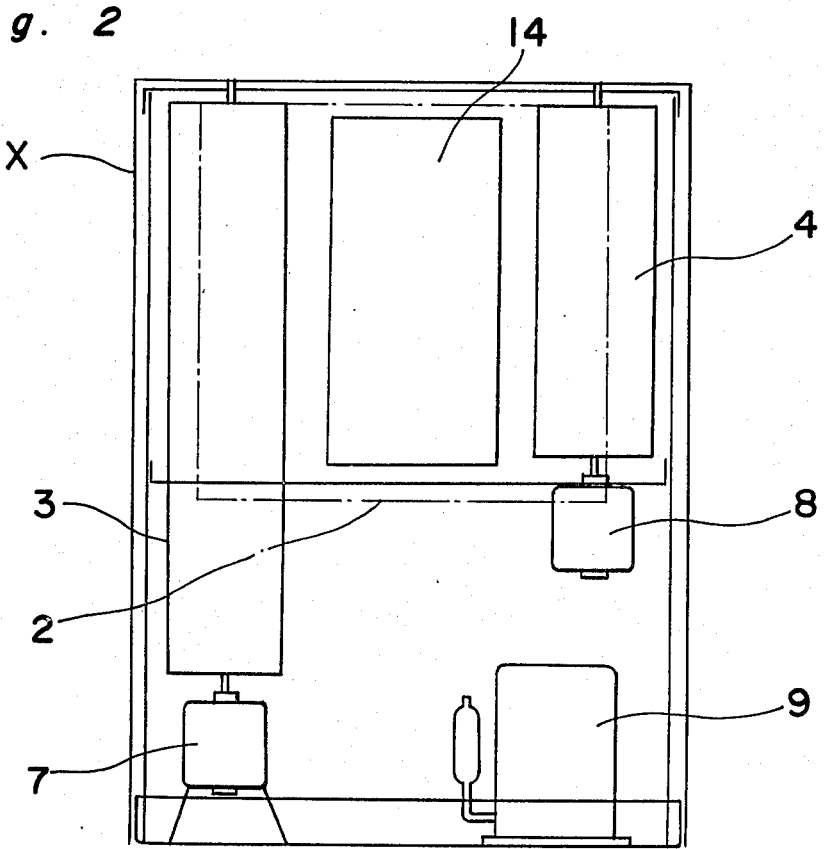
FIG. 2 is a schematic cross-sectional view of the heat pump air conditioner of the present invention.
Figure 3:
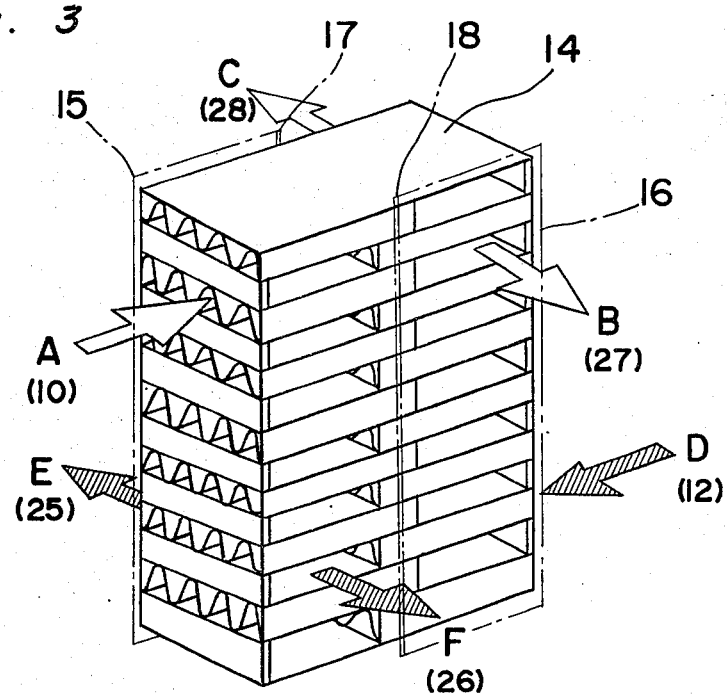
FIG. 3 is a partial appearance view of a total heat exchanger used in the heat pump air conditioner of the present invention.
Figure 6:
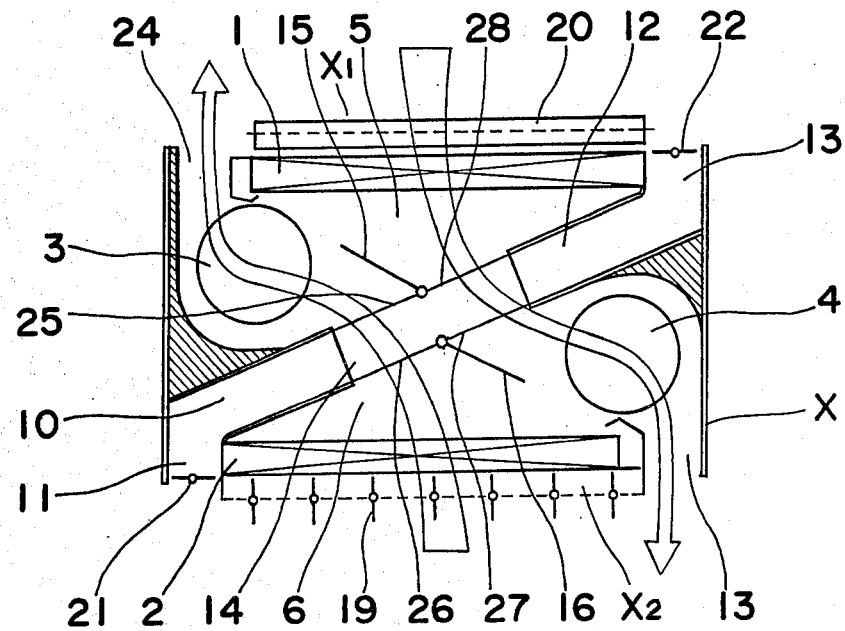

Referring to FIGS. 1 to 3, within a box body X of an air conditioning machine in one embodiment of the present invention, there are provided in blocks an indoor-air circulation wind passage 6, an outdoor-air circulation wind passage 5, a ventilation wind passage composed of an indoor-air exhaust wind passage 10 and an outdoor-air feed wind passage 12, and a total heat exchanger 14 of opposite flow type disposed between said indoor-air exhaust wind passage 10 and outdoor-air feed wind passage 12, one end of said outdoor-air feed wind passage 12 being open, through said total heat exchanger 14, to the middle portions of said indoor-air circulation wind passage 6 and said outdoor-air circulation wind passage 5, one end of the indoor-air exhaust wind passage 10 being open, through the same heat exchanger 14, to the middle portions of said indoor-air circulation wind passage 6 and said outdoor-air circulation wind passage 5. Also, an outdoor heat exchanger 1 of a heat pump is provided within one opening X1 of the box body X to be disposed in said outdoor-air circulation wind passage 5, while an indoor heat exchanger 2 of a heat pump is provided within the other opening X2 of the box body X to be disposed in said indoor-air circulation wind passage 6. Cross-flow fans 3 and 4 are provided respectively in the outdoor-air circulation wind passage 5 and indoor-air circulation wind passage 6 as blowers for circulating the outdoor air and the indoor air. Within the outdoor-air circulation wind passage 5 out door air is circulated by the fan 3 driven by a fan motor 7 from the outside atmosphere to an exhaust port 24 disposed in the opening of the box body X toward the outside atmosphere through the outdoor heat-exchanger 1. Also, within the indoor-air circulation wind passage 6 indoor air is circulated by the fan 4 driven by a fan motor 8 from the inside of a room to an exhaust port 23 disposed in the opening X2 of the body X toward the inside of the room through the outdoor heat exchanger 2. In addition, there is provided a compressor 9 for the heat pumps of heat exchangers 1 and 2 within the box body X, shutters 19 and 20 disposed in the openings of the box body X on the front faces of the indoor heat exchanger 2 and the outdoor heat exchanger 1, respectively, outer dampers 21 and 22 which open or shut an indoor air inlet port 11 disposed at the other end of the indoor-air exhaust wind-passage 10 and an outdoor-air inlet port 13 disposed at the other end of the outdoor-air feed wind passage 12, respectively, inner dampers 15 and 16 which are adapted to rotate around respective shafts 17 and 18 to open or shut passages of the total heat exchanger 14 installed between the wind passages 10 and 12, as described below. The total heat exchanger 14 installed at the intersecting portion between the wind passages 10 and 12 has, spacing boards made of kraft paper built up into a laminated layer as shown in FIG. 3. Referring to FIG. 3, an A air currents and a D air currents which have entered the total heat exchanger 14 from the mutually opposite faces respectively disposed toward said indoor-air exhaust wind passage 10 and said outdoor-air feed wind passage 12, are heat-exchanged in opposite air currents. Thereafter, they are distributed into outlets 27 and 26, and 28 and 25, each pair disposed in the right and left faces respectively towards said indoor-air circulation wind passage 6 and said outdoor-air circulation wind passage 5 to respectively form a B air currents and an F air currents, a C air currents and an E air currents thereby to direct the respective air currents out of the total heat exchanger 14. The total heat exchanger 14 is provided with such wind passages as to allow the air currents to flow as described hereinabove. One of each pair of air currents outlets of the total heat exchanger 14 is normally closed by said inner dampers 15 and 16 as shown in FIG. 1 to prevent the feed air currents of the outdoor air from passing into the wind passage 5 for circulating the outdoor air, or the exhaust currents of the indoor air from passing into the wind passage 6 for circulating the indoor air. During the simultaneous feed, exhaust ventilating operation, the dampers 15 and 16 are open as shown in FIG. 6 to short-circuit the wind passage 5 for circulating the outdoor air and the wind passage 6 for circulating the indoor air through the total heat exchanger 14 and to change the direction of flow of the air current developed by the cross-flow fans 3 and 4. Thus, the air currents, which enter the wind passage 6 for circulating the indoor air from the indoor, can be introduced outdoors by the blower 3, while the air currents, which enter the wind passage 5 for circulating the outdoor air from the outdoors can be introduced indoors by the blower 4, thus allowing the ventilation to be performed.

The operation of each unit and the condition of the air current flows in operation modes where the various functions are performed in a wind type heat pump air conditioner of such characters as described hereinabove will be described hereinafter with reference to the FIGS. 1, 4, 5 and 6.

FIG. 1 shows the flows of the air currents and the operation of each unit during the cooling or heating operation. The heat pumps 1 and 2 are operated with dampers 15 and 16, and 21 and 22 shut, and shutters 19 and 20 being open. The air flows developed by the fans 3 and 4 from the shutters 19 and 20 to the exhaust ports 23 and 24 through the heat pumps 1 and 2.

Figure 4:
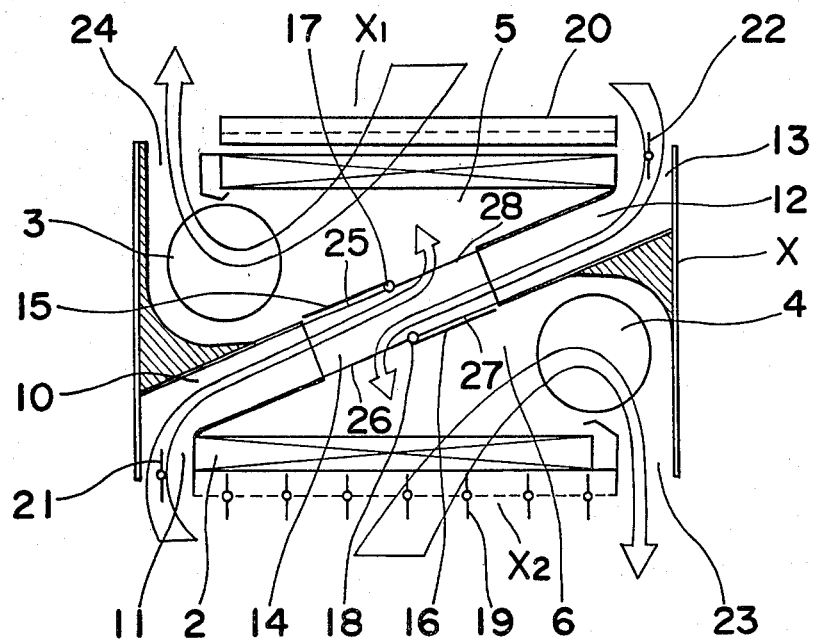

FIG. 4 shows the flows of the air currents and the condition of each unit in a case where the total heat exchange ventilation is partially mixed during the air cooling, heating operation. The dampers 21 and 22 are opened from the condition of FIG. 1, to suck the indoor air and the outdoor air from the inlet ports 11 and 13 by the blowers 3 and 4. The total heat exchange of the air is performed within the total heat exchanger 14. In addition to the air currents of FIG. 1, the air flows from the dampers 21 and 22 to the exhaust ports 23 and 24 through the total heat exchanger 14. Thereafter, the air is mixed with the outdoor circulation air and the indoor circulation air. In this case, the ratio of the amount of ventilation air to the total amount of air of the indoor blow-off can be remotely controlled by the regulation of the degrees of opening of the shutters 19 and 20.

Figure 5:
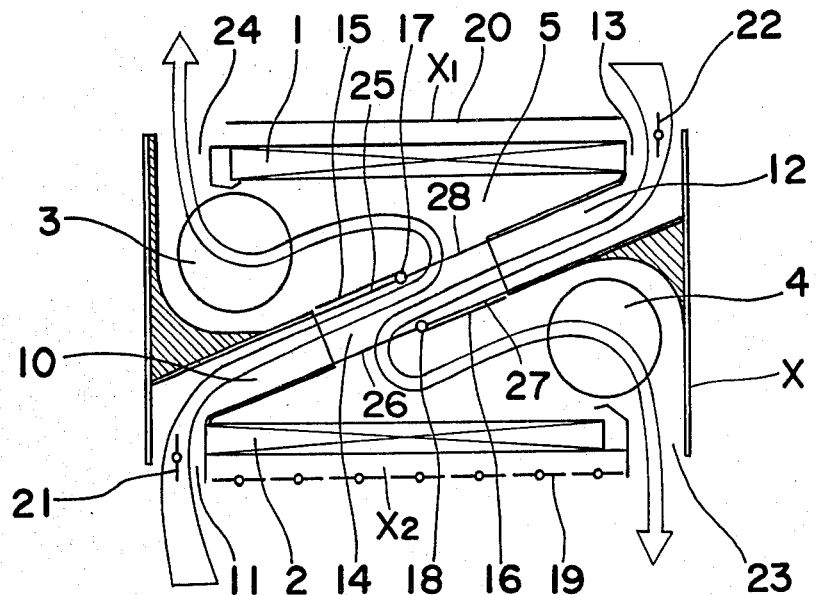

FIG. 5 shows the flows of the air currents and the condition of each unit during the total heat exchange ventilation in which the compressor 9, is stopped the dampers 21 and 22 are open and the dampers 15 and 16 and shutters 19 and 20 are shut. In this case, the outdoor air is drawn inward by the blower 4, and is inhaled from the outdoor-air inlet port 13. It passes into the outdoor-air feed wind passage 12 and is exchanged in total heat with the exhaust air from the interior of the room, within the total heat exchanger 14 so as to be fed to the indoors. Similarly, the exhaust air from the indoor is drawn inward by the blower 3. It passes into the indoor-air inlet port 11 and the indoor-air exhaust wind passage 10 and is exchanged in total heat with the feed air from the outdoors, within the total heat exchanger 14 so as to be exhausted outdoors. The functions are completely the same as those of the ordinary air-conditioning ventilating fans. Thusly, total heat exchange ventilation with reduced loss of the heat energy can be performed.

It is to be noted that the amount of ventilation air is 2 $m^3$ per minute and the exchange efficiency of enthalpy is approximately 60%.

FIG. 6 shows the flows of the air currents and the condition of each unit during the simultaneous feed and exhaust ventilation (non-heat-exchange ventilation). By stopping the compressor 9, opening the dampers 15 and 16, shutting the dampers 21 and 22, opening the shutters 19 and 20, the indoor air which enters the indoor-air circulation wind passage 6 is sucked outdoors by the blower 3 through the total heat exchanger 14, or the outdoor air which enters the outdoor-air circulation wind passage 5 is sucked indoors by the blower 4 through the total heat exchanger 14, thereby to perform the simultaneous feed and exhaust ventilation.

In this case, the total heat exchanger 14 becomes only an air current passage in construction. Both of the currents are not exchanged in heat within the total heat exchanger 14 which provide four outlet openings 25 and 26, and 27 and 28, respectively on the side of the outdoor-air circulation wind passage 5, adjacent indoor-air exhaust wind passage 10 and adjacent the outdoor-air feed wind passage 12 and on the side of the indoor-air circulation wind passage 6, adjacent the indoor-air exhaust wind passage 10, and adjacent outdoor-air feed wind passage 12. In this case, the four outlet openings become short-circuits of both the outdoor-air circulation wind passage 5 and the indoor-air circulation wind passage 6.

On the other hand, the dampers 15 and 16 not only open and shut the wind passages, but also function as controlling plates, which are adapted to vary the direction of air current flow developed by the blowers 3 and 4.

Such ventilating functions as described hereinabove are the same as those of the ordinary ventilating fans or wind fans of the simultaneous feeding and exhausting operations. It is to be noted that the amount of ventilation air developed in accordance with the present embodiment is approximately 3 m³ per minute.

As described hereinabove, the heat pump air conditioner of the present invention can perform its ventilating operation in partial total heat exchange even during the cooling and heating operation as compared with the conventional one. The long hours' cooling and heating operations can be effected in a closed room, and the ventilation loss can be controlled to the utmost.

The air conditioning machine can be put into use as an air-conditioning ventilating fan, simultaneous feed and exhaust ventilating fan, wind fan or the like, in addition to a cooling heating air conditioner. Thus, energy-saving ventilation, general ventilation, open-air cooling, etc. can be performed. It can become a new heat pump of a wind type, which can be used throughout the year.

Needless to say, similar effects can be provided with the exception of the total heat exchanging function, even if a sensible heat exchanger of similar construction, instead of the total heat exchanger in the disclosed embodiment, is used.

Although the present invention has been fully described by way of example with reference to the accompanying drawings, it is to be noted that various changes and modifications will be apparent to those skilled in the art. Therefore, unless such changes and modifications otherwise depart from the scope of the present invention, they should be constructed as included therein.

What is claimed is:

1. An air-conditioning machine, comprising
   a. a casing having therein first, second, and third compartments, respectively defining an indoor air circulation passage, an outdoor air circulation passage and a ventilation passage between said indoor air circulation passage and said outdoor air circulation passage;
   b. an indoor heat exchanger adjacent said indoor air circulation passage, and first air drawing means, in said indoor air circulation passage, for drawing indoor air through said indoor heat exchanger and circulating the indoor air through said indoor air circulation passage;
   c. an outdoor air heat exchanger adjacent said outdoor air circulation passage, and second air drawing means in said outdoor air circulation passage, for drawing outdoor air through said outdoor air heat exchanger and circulating the outdoor air through said outdoor air circulation passage;
   d. a central heat exchanger of the opposite air flow type disposed in said ventilation passage between said indoor and outdoor circulation passages having first and second openings on opposite sides thereof providing, when open, fluid communication therethrough between said indoor and outdoor air circulation passages, and third and fourth openings on opposite sides of said central heat exchanger providing, when open, fluid communication therethrough between said indoor and outdoor air circulation passages; and
   means, including dampers for opening and closing at least one each of said first and second openings and of said third and fourth openings, on opposite sides of said central heat exchanger;
   said ventilation passage including an indoor air exhaust passage in fluid communication at one end thereof with said third opening along a first path through said central heat exchanger, and an outdoor air supply passage in fluid communication at one end thereof with said second opening along a second path through said central heat exchanger; said first and second paths extending through said central heat exchanger in heat exchanging relation to one another.

2. An air-conditioning machine in accordance with claim 1, wherein said dampers comprise plates which open into said indoor and outdoor air circulation passages to control the direction of flow of air drawn by said air drawing means.

3. An air-conditioning machine in accordance with claim 1, wherein both of said indoor heat exchanger and outdoor heat exchanger comprise heat pumps.

4. An air-conditioning machine as in claim 1, wherein said first and second openings are in fluid communication with each other along a third path through said central heat exchanger, and said third and fourth openings are in fluid communication with each other along a fourth path through said central heat exchanger; said third and fourth paths being in generally non-heat-exchange relation with each other, said dampers being operable together to provide generally non-heat-exchange fluid communication between said indoor and outdoor air circulation passages along said third and fourth paths.

5. An air-conditioning machine as in claim 7, wherein said dampers comprise plates which open into said indoor and outdoor air circulation passages to control the direction of flow of air drawn by said air drawing means.

6. An air-conditioning machine as in claim 4, wherein said first air drawing means comprises a first blower disposed adjacent one of said second and third openings and said second air drawing means comprises a second blower disposed adjacent the other of said second and third openings so that when said first, second, third and fourth openings are open, said first and second blowers draw air in opposite directions through said central heat exchanger along said third and fourth paths.

7. An air-conditioning machine as in claim 1, wherein said indoor air supply passage has a fifth opening at an end thereof opposite said one end of said indoor air exhaust passage for communicating with the indoor atmosphere and means for opening and closing said fifth opening, and said outdoor air supply passage has a sixth opening at an end thereof opposite said one end of said outdoor air supply passage for communicating with the outdoor atmosphere and means for opening and closing said sixth opening.

8. An air conditioning machine as in claim 6, wherein said indoor air supply passage has a fifth opening at an end thereof opposite said one end of said indoor air exhaust passage for communicating with the indoor atmosphere and means for opening and closing said fifth opening, and said outdoor air supply passage has a sixth opening at an end thereof opposite said one end of said outdoor air supply passage for communicating with the outdoor atmosphere and means for opening and closing said sixth opening.

9. An air-conditioning machine as in claim 8, wherein said central heat exchanger has the shape of a rectangle having opposing elongated sides, said first and third openings being disposed side-by-side on one of said elongated sides, said second and fourth openings being disposed side-by-side on the other of said elongated side, said indoor and outdoor air circulation passages opening to said central heat exchanger on opposing sides of said rectangle joining said first and second elongated sides.

10. An air-conditioning machine, comprising
   a. a casing having therein first, second, and third compartments, respectively defining an indoor air circulation passage, and outdoor air circulation passage and a ventilation passage between said indoor air circulation passage and said outdoor air circulation passage;
   b. an indoor heat exchanger adjacent said indoor air circulation passage, and first air drawing means, in said indoor air circulation passage, for drawing indoor air through said indoor heat exchanger and circulating the indoor air through said indoor air circulation passage;
   c. an outdoor air heat exchanger adjacent said outdoor air circulation passage, and second air drawing means in said outdoor air circulation passage, for drawing outdoor air through said outdoor air heat exchanger and circulating the outdoor air through said outdoor air circulation passage;
   d. a central heat exchanger of the opposite air flow type disposed in said ventilation passage between said indoor and outdoor circulation passages having first and second openings on opposite sides thereof providing, when open, fluid communication therethrough between said indoor and outdoor air circulation passages, and third and fourth openings on opposite sides of said central heat exchanger providing, when open, fluid communication therethrough between said indoor and outdoor air circulation passages; and means, including dampers for opening and closing at least two of said first, second, third and fourth openings, for alternatively blocking flow through said central heat exchanger to block ventilation while said first and second heat exchanger are heating or cooling, directing indoor and outdoor air respectively through said central heat exchanger along said first and second paths in heat exchanging relation to ventilate the indoor air while said first and second heat exchanger are heating or cooling, and directing indoor and outdoor air respectively through said central heat exchanger along said third and fourth paths in non-heat-exchanging relation;

said ventilation passage including an indoor air exhaust passage in fluid communication at one end thereof with said third opening along a first path through said central heat exchanger, and an outdoor air supply passage in fluid communication at one end thereof with said second opening along a second path through said central heat exchanger; said first and second paths extending through said central heat exchanger in heat exchanging relation to one another.

* * * * *